(12) United States Patent
Anders et al.

(10) Patent No.: US 8,075,673 B2
(45) Date of Patent: *Dec. 13, 2011

(54) ABSORPTION MEDIUM AND METHOD FOR REMOVING CARBON DIOXIDE FROM GAS STREAMS

(75) Inventors: Joachim-Thierry Anders, Gonnheim (DE); Johann-Peter Melder, Boehl-Iggelheim (DE); Norbert Asprion, Mannheim (DE); Ole Brettschneider, Berlin (DE); Iven Clausen, Mannheim (DE); Bernd Eck, Viernheim (DE); Ute Lichtfers, Karlsruhe (DE)

(73) Assignee: BASF SE, Ludwigshafen (DE)

( * ) Notice: Subject to any disclaimer, the term of this patent is extended or adjusted under 35 U.S.C. 154(b) by 635 days.

This patent is subject to a terminal disclaimer.

(21) Appl. No.: 12/090,378

(22) PCT Filed: Oct. 19, 2006

(86) PCT No.: PCT/EP2006/067586
§ 371 (c)(1),
(2), (4) Date: Apr. 16, 2008

(87) PCT Pub. No.: WO2007/045679
PCT Pub. Date: Apr. 26, 2007

(65) Prior Publication Data
US 2008/0236390 A1    Oct. 2, 2008

(30) Foreign Application Priority Data

Oct. 20, 2005    (DE) .................. 10 2005 050 385

(51) Int. Cl.
*B01D 53/14* (2006.01)
(52) U.S. Cl. ............. 95/171; 95/172; 95/183; 95/236; 423/228; 423/229; 252/60

(58) Field of Classification Search .......... 95/236; 96/181, 236; 423/228–229; 252/60
See application file for complete search history.

(56) References Cited

U.S. PATENT DOCUMENTS
4,073,863 A    2/1978    Giammarco et al.
(Continued)

FOREIGN PATENT DOCUMENTS
DE    4201921    7/1992
(Continued)

OTHER PUBLICATIONS

Dan G. Chapel et al., "Recovery of $CO_2$ from Flue Gases: Commercial Trends," (presented at the annual meeting of the Canadian Society of Chemical Engineers, Oct. 4-6, 1999, Saskatoon, Saskatchewan, Canada).

*Primary Examiner* — Duane Smith
*Assistant Examiner* — Ives Wu
(74) *Attorney, Agent, or Firm* — Connolly Bove Lodge & Hutz LLP

(57) ABSTRACT

A description is given of an absorption medium for removing carbon dioxide from gas streams which comprises aqueous solution of an amine of the formula I $$HNR_2 \qquad (I)$$

Figure 1:
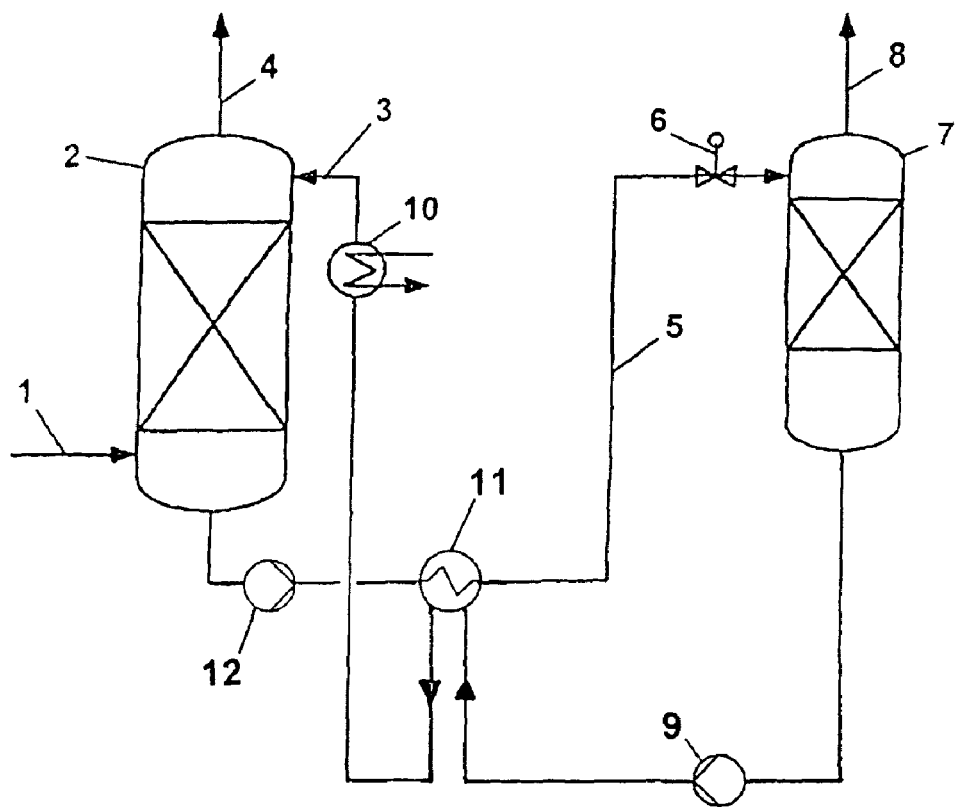

where one or both radicals R are

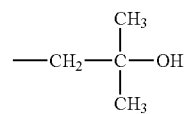

and the other radical R is hydrogen. The absorption medium is distinguished by particular oxidation resistance.

17 Claims, 1 Drawing Sheet

U.S. PATENT DOCUMENTS

| | | | |
|---|---|---|---|
| 4,094,957 A | 6/1978 | Sartori et al. | |
| 4,217,238 A | 8/1980 | Sartori et al. | |
| 4,278,646 A | 7/1981 | Lynn et al. | |
| 4,292,196 A | 9/1981 | Homeier et al. | |
| 4,376,102 A | 3/1983 | Thaler et al. | |
| 4,400,368 A | 8/1983 | Diaz | |
| 4,405,586 A | 9/1983 | Sartori et al. | |
| 4,405,811 A | 9/1983 | Stogryn et al. | |
| 5,348,714 A | 9/1994 | Peytavy et al. | |
| 5,373,048 A | 12/1994 | Witzeman et al. | |
| 5,744,110 A | 4/1998 | Mimura et al. | |
| 6,071,484 A * | 6/2000 | Dingman et al. | 423/229 |
| 6,267,939 B1 | 7/2001 | Gemes et al. | |
| 6,500,397 B1 * | 12/2002 | Yoshida et al. | 423/228 |
| 6,939,393 B2 | 9/2005 | Asprion | |
| 7,887,620 B2 | 2/2011 | Asprion | |
| 2004/0036055 A1 | 2/2004 | Asprion et al. | |
| 2005/0202967 A1 | 9/2005 | Hoefer et al. | |
| 2006/0117954 A1 | 6/2006 | Versteeg et al. | |
| 2006/0121204 A1 * | 6/2006 | Nakae et al. | 427/402 |
| 2008/0025893 A1 | 1/2008 | Asprion et al. | |
| 2008/0098892 A1 | 5/2008 | Asprion | |
| 2009/0199713 A1 * | 8/2009 | Asprion et al. | 95/236 |
| 2009/0211447 A1 | 8/2009 | Lichtfers | |
| 2010/0186590 A1 | 7/2010 | Vorberg et al. | |
| 2010/0236408 A1 | 9/2010 | Asprion | |

FOREIGN PATENT DOCUMENTS

| | | |
|---|---|---|
| DE | 102004011427 | 9/2005 |
| EP | 0331788 | 9/1989 |
| EP | 0368422 | 5/1990 |
| EP | 279 667 | 9/1995 |
| EP | 0671200 | 9/1995 |
| EP | 0 768 365 | 4/1997 |
| EP | 1062999 | 12/2000 |
| EP | 1582250 | 10/2005 |
| GB | 786669 | 11/1957 |
| GB | 1543748 | 4/1979 |
| JP | 08252430 | 1/1996 |
| WO | WO 02/07862 | 1/2002 |
| WO | WO 02/09849 | 2/2002 |
| WO | WO 2004/082809 | 9/2004 |
| WO | WO 2005/044955 | 5/2005 |
| WO | WO 2005/087350 | 9/2005 |
| WO | WO-2005087349 | 9/2005 |
| WO | WO 2006/022885 | 3/2006 |
| WO | WO 2007/045679 | 4/2007 |
| WO | WO 2007/104800 | 9/2007 |

* cited by examiner

ABSORPTION MEDIUM AND METHOD FOR REMOVING CARBON DIOXIDE FROM GAS STREAMS

CROSS REFERENCE TO RELATED APPLICATIONS

This application is a National Phase filing under 35 U.S.C. §371 of PCT/EP2006/067586 filed Oct. 19, 2006, which claims priority to Patent Application No. 102005050385.3, filed in Germany on Oct. 20, 2005. The entire contents of each of the above-applications are incorporated herein by reference.

The present invention relates to an absorption medium for removing carbon dioxide from gas streams and to a method using the absorption medium.

In numerous processes in the chemical industry, fluid streams occur which comprise acid gases such as, for example, $CO_2$, $H_2S$, $SO_2$, $CS_2$, HCN, COS, $NO_x$, disulfides or mercaptans as impurities. These fluid streams can be, for example, gas streams, such as natural gas, synthesis gas, refinery gas, or reaction gases which are produced in the oxidation of organic materials, such as, for example, organic wastes, coal, natural gas or mineral oil, or in the composting of waste materials comprising organic substances.

The removal of acid gases is of particular importance for various reasons. For example, the content of sulfur compounds of natural gas must be reduced by suitable treatment measures directly at the natural gas source, since the sulfur compounds, together with the water frequently entrained by the natural gas, also form acids which have a corrosive action. For transport of natural gas in a pipeline, therefore preset limit values of sulfur impurities must be maintained. The acid gases must be removed from the reaction gases produced in the oxidation of organic materials in order to prevent the emission of gases which can damage the natural environment or affect the climate.

On an industrial scale, frequently aqueous solutions of organic bases, e.g. alkanolamines, are used as absorption media. When acid gases are dissolved, ionic products are formed from the base and the acid gas components. The absorption medium can be regenerated by expansion to a lower pressure or by stripping, the acid gases again being released and/or stripped off by steam. After the regeneration process, the absorption medium can be reused.

The known absorption media are very highly suitable for deacidifying hydrocarbons streams such as natural gas. Certain problems occur in the treatment of oxygen-containing fluids, e.g. flue gases. In this case the absorption capacity of the absorption medium worsens over the long term and is not completely recovered in the regeneration. The presence of molecular oxygen is thought to be responsible for oxidative decomposition of the amines present in the absorption medium.

The object underlying the invention is to specify an absorption medium and a method for deacidifying fluid streams, the absorption capacity of the absorption medium being retained in the long term.

The object is achieved by an absorption medium which comprises an aqueous solution of an amine of the formula I $$HNR_2 \quad (I)$$

where one or both radicals R are

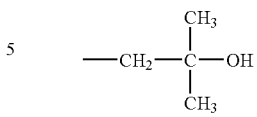

and the other radical R is hydrogen.

In one embodiment, the compound of the formula I is 1-amino-2-methylpropan-2-ol, (CAS 2854-16-2; hereinafter: 1A2MP). In another embodiment, it is amino-di-tert-butyl alcohol. It has been found that both compounds exhibit surprisingly high oxygen stability.

The first step of the decomposition induced by molecular oxygen is presumably the abstraction of a hydrogen atom by the carbon atom in the α-position to the amino group. Amines in which the α-carbon atoms solely bear substituents different from hydrogen are very resistant to oxidative decomposition. In 1A2MP, the carbon atom in the α-position to the amino group is a primary carbon atom, i.e. it bears two hydrogen atoms. Surprisingly, this structure, however, has been found to be highly resistant to the action of molecular oxygen. The stability to oxygen-induced decomposition is particularly critical for flue gas scrubbers, so that the novel absorption medium here is a considerable improvement.

The inventive absorption medium, in addition to the amine of the formula I, can comprise one or more further amines, in order, for example, to optimize the loading capacity of the absorption medium with carbon dioxide or other acid gas components, the mass-transfer rate for carbon dioxide or other acid gas components, and/or other factors. The other amine or amines customarily comprise 4 to 12 carbon atoms.

The absorption medium is usually present in the form of an aqueous solution having a total amine content of generally 10 to 65% by weight, preferably 25 to 60% by weight. To the amine of the formula I is generally apportioned at least 1% by weight, preferably at least 5% by weight, based on the absorption medium.

In addition to water, the solutions can comprise physical solvents which are, for example, selected from cyclotetramethylene sulfone (sulfolane) and derivatives thereof, aliphatic acid amides (acetylmorpholine, N-formylmorpholine), N-alkylated pyrrolidones and corresponding piperidones, such as N-methylpyrrolidone (NMP), propylene carbonate, methanol, dialkyl ethers of polyethylene glycols and mixtures thereof.

The inventive absorption medium can comprise further functional components, such as stabilizers, in particular antioxidants, see, e.g., DE 102004011427. Addition of acids, such as phosphoric acid, formic acid or sulfonic acids, can be suitable for reducing the energy required for regeneration of the loaded absorption medium.

Suitable amines which can be present in the inventive absorption medium in addition to the amine of the formula I are selected, e.g., from (A) tertiary amines (this is taken to mean including tertiary monoamines or polyamines solely having tertiary amino groups);

(B) primary amines, where the amino group is bound to a tertiary carbon atom;

(C) secondary amines, where the amino group is bound to at least one secondary or tertiary carbon atom;
and mixtures thereof.

Preferred amines of this type are selected from
(A) tertiary amines having three hydroxyalkyl groups on the nitrogen atom, where the amino group is separated from the hydroxyl groups by at least two carbon atoms, such as triethanolamine (TEA);
tertiary amines having one or two hydroxyalkyl groups and two or one unsubstituted alkyl groups on the nitrogen atom, where the amino group is separated from the hydroxyl group(s) by at least two carbon atoms,
such as diethylethanolamine (DEEA), methyldiethanolamine (MDEA), 3-dimethylamino-1-propanol (DIMAP), dimethylethanolamine (DMEA), methyldiisopropanolamine (MDIPA);
diamines having two tertiary amino groups;
such as N,N,N',N'-tetramethylethylenediamine, N,N-diethyl-N',N'-dimethylethylenediamine, N,N,N',N'-tetraethylethylenediamine, N,N,N',N'-tetramethyl-1,3-propanediamine and N,N,N',N'-tetraethyl-1,3-propanediamine and also bis(dimethylaminoethyl) ether.
(B) primary amines having at least one hydroxyl group, where the amino group is bound to a tertiary carbon atom and is separated from the hydroxyl group by at least two carbon atoms,
such as 2-amino-2-methyl-1-propanol (AMP), 3-amino-3-methyl-2-pentanol, 2,3-dimethyl-3-amino-1-butanol, 2-amino-2-ethyl-1-butanol, 2-amino-2-methyl-3-pentanol, 2-amino-2-methyl-1-butanol, 3-amino-3-methyl-1-butanol, 3-amino-3-methyl-2-butanol, 2-amino-2,3-dimethyl-3-butanol, 2-amino-2,3-dimethyl-1-butanol and 2-amino-2-methyl-1-pentanol, of which 2-amino-2-methyl-1-propanol is preferred;
(C) secondary amines having at least one hydroxyl group, where the amino group is bound to at least one secondary or tertiary carbon atom and is separated from the hydroxyl group by at least two carbon atoms,
such as 2-(isopropylamino)ethanol, 2(sec-butylamino) ethanol, 2-piperidineethanol;
and mixtures thereof.
Preferred absorption media comprise
(i) 1 to 30% by weight, preferably 5 to 25% by weight, of amine of the formula I and
(ii) 10 to 60% by weight, preferably 15 to 50% by weight, of one or more amines (A) to (C), in each case based on the total weight of the absorption medium, with the proviso that the maximum total amine content of the absorption medium is 65% by weight.
In other embodiments, the inventive absorption medium, in addition to the amine of the formula I, comprises at least one amine which is selected from
(D) primary or secondary alkanolamines;
(E) alkylenediamines;
(F) polyalkylenepolyamines;
(G) amines of the general formula

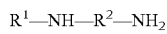

where $R^1$ is $C_1$-$C_6$-alkyl and $R^2$ is $C_2$-$C_6$-alkylene;
(H) cyclic amines having a 5-, 6- or 7-membered saturated ring which comprises an NH group and if appropriate a further heteroatom, in particular an oxygen or nitrogen atom;
and mixtures thereof.
Particularly suitable amines of this type are selected from
(D) monoethanolamine (MEA), diethanolamine (DEA), diisopropylamine (DIPA), aminoethoxyethanol (AEE);
(E) hexamethylenediamine;
(F) diethylenetriamine; triethylenetetramine, 3,3-iminobispropylamines; preferably diethylenetriamine;
(G) 3-methylaminopropylamine (MAPA);
(H) piperazine, 2-methylpiperazine, N-methylpiperazine, N-ethylpiperazine, N-aminoethylpiperazine, homopiperazine, piperidine, morpholine;
and mixtures thereof.
Preferred absorption media comprise
(i) 20 to 60% by weight, preferably 25 to 50% by weight, of amine of the formula I and
(ii) 1 to 25% by weight, preferably 3 to 20% by weight, of one or more amines (D) to (H), in each case based on the total weight of the absorption medium, with the proviso that the maximum total amine content of the absorption medium is 65% by weight.
The invention also relates to a method for removing carbon dioxide from a gas stream, the gas stream being brought into contact with a liquid absorption medium which comprises an aqueous solution of an amine of the formula I.
In addition to carbon dioxide, other acid gases and/or their precursor compounds, such as, e.g., $H_2S$, $SO_2$, $CS_2$, HCN, COS, $NO_x$, disulfides or mercaptans, are partially or completely removed from the gas stream.
The method is particularly suitable for gas streams in which the partial pressure of the carbon dioxide in the gas stream is less than 500 mbar, preferably less than 200 mbar, usually 20 to 150 mbar.
The gas stream is preferably a gas stream which is formed in the following manner:
a) oxidation of organic substances, e.g. (flue gases),
b) composting and storage of waste materials comprising organic substances, or
c) bacterial decomposition of organic substances.
The oxidation can be carried out with appearance of flame, i.e. as customary combustion, or as oxidation without flame appearance, e.g. in the form of a catalytic oxidation or partial oxidation. Organic substances which are subjected to combustion are customarily fossil fuels such as coal, natural gas, mineral oil, gasoline, diesel, raffinates or kerosene, biodiesel or waste materials having a content of organic substances. Starting materials of the catalytic (partial) oxidation are, e.g., methanol or methane which can be reacted to form formic acid or formaldehyde.
Waste materials which are subjected to oxidation, composting or storage, are typically domestic refuse, plastic wastes or packaging refuse.
The combustion of organic substances usually proceeds in customary incineration plants with air. Composting and storage of waste materials comprising organic substances generally proceeds in refuse landfills. The exhaust gas or the exhaust air of such plants can advantageously be treated by the inventive method.
As organic substances for bacterial decomposition, use is customarily made of stable manure, straw, liquid manure, sewage sludge, fermentation residues and the like. Bacterial decomposition proceeds, e.g., in customary biogas plants. The exhaust air of such plants can advantageously be treated by the inventive method.
The method is also suitable for treating the exhaust gases of fuel cells or chemical synthesis plants which make use of a (partial) oxidation of organic substances.
In addition, the inventive method can of course also be used to treat unburnt fossil gases, such as natural gas, e.g. coal seam gases, i.e. gases produced in the extraction of coal; which are collected and compressed.

Generally, these gas streams, under standard conditions, comprise less than 50 mg/m$^3$ of sulfur dioxide.

The starting gases can either have the pressure which roughly corresponds to the pressure of the ambient air, i.e. atmospheric pressure or a pressure which deviates from atmospheric pressure by up to 1 bar.

Suitable apparatuses for carrying out the inventive method comprise at least one scrubbing column, e.g. random packing columns, ordered packing columns and tray columns, and/or other absorbers such as membrane contactors, radial stream scrubbers, jet scrubbers, Venturi scrubbers and rotary spray scrubbers. Treatment of the gas stream by the absorption medium preferably proceeds in a scrubbing column in countercurrent flow. The gas stream is generally fed into the lower region and the absorption medium into the upper region of the column.

Suitable columns for carrying out the inventive method are also scrubbing columns made of plastic, such as polyolefins or polytetrafluoroethylene, or scrubbing columns whose inner surface is partly or completely lined with plastic or rubber. In addition, membrane contactors having a plastic housing are suitable.

The temperature of the absorption medium is generally about 30 to 70° C. in the absorption step, then when a column is used, for example 30 to 60° C. at the top of the column and 40 to 70° C. at the bottom of the column. A product gas (byproduct gas) low in acid gas components, i.e. depleted in these components, and an absorption medium loaded with acid gas components are obtained.

The carbon dioxide can be liberated from the absorption medium loaded with the acid gas components in a regeneration step, a regenerated absorption medium being obtained. In the regeneration step the loading of the absorption medium is decreased and the resultant regenerated absorption medium is preferably subsequently recycled to the absorption step.

Generally, the loaded absorption medium is regenerated by
a) heating, e.g. to 70 to 120° C.,
b) expanding,
c) stripping with an inert fluid
or a combination of two or all of these measures.

Generally, the loaded absorption medium is heated for regeneration and the liberated carbon dioxide is separated off, e.g. in a desorption column. Before the regenerated absorption medium is reintroduced into the absorber, it is cooled to a suitable absorption temperature. In order to utilize the energy present in the hot regenerated absorption medium, it is preferred to preheat the loaded absorption medium from the absorber by heat exchange with the hot regenerated absorption medium. The heat exchange brings the loaded absorption medium to a higher temperature, so that in the regeneration step a lower energy usage is required. Via the heat exchange, a partial regeneration of the loaded absorption medium can already be performed with liberation of carbon dioxide. The resultant gas-liquid mixed phase stream is passed into a phase separation vessel from which the carbon dioxide is taken off; the liquid phase is passed into the desorption column for complete regeneration of the absorption medium.

Frequently, the carbon dioxide liberated in the desorption column is subsequently compressed and fed, e.g., to a pressure tank or to sequestration. In these cases, it can be advantageous to carry out the regeneration of the absorption medium at a relatively high pressure, e.g. 2 to 10 bar, preferably 2.5 to 5 bar. The loaded absorption medium for this is compressed by means of a pump to the regeneration pressure and introduced into the desorption column. The carbon dioxide occurs in this manner at a higher pressure level. The pressure difference from the pressure level of the pressure tank is less and under some circumstances a compression stage can be saved. A higher pressure during regeneration necessitates a higher regeneration temperature. At a higher regeneration temperature, a lower residual loading of the absorption medium can be achieved. The regeneration temperature is generally only limited by the thermal stability of the absorption medium.

Before the inventive absorption medium treatment, the flue gas is preferably subjected to a scrubbing using an aqueous liquid, in particular water, in order to cool the flue gas and moisten it (quench it). In the scrubbing, dusts or gaseous impurities such as sulfur dioxide can also be removed.

The invention will be described in more detail with reference to the accompanying drawings and the examples hereinafter.

FIG. 1 is a diagrammatic representation of a plant suitable for carrying out the inventive method.

According to FIG. 1, a suitably pretreated carbon dioxide-containing combustion gas, in an absorber 2, is brought, via a feed line 1, into contact in countercurrent flow with the regenerated absorption medium which is fed via the absorption medium line 3. The absorption medium removes carbon dioxide by absorption from the combustion gas; via an exhaust gas line 7 a pure gas low in carbon dioxide is produced. The absorber 2 can have, above the absorption medium inlet, backwash trays or backwash sections which are preferably equipped with ordered packings (not shown), where, using water or condensate, entrained absorption medium is separated off from the $CO_2$-depleted gas. The liquid on the backwash tray is recycled in a suitable manner via an external cooler.

Via an absorption medium line 5, a pump 12, a solvent-solvent heat exchanger 11 in which the acid gas-loaded absorption medium is heated by the heat from the regenerated absorption medium coming from the bottom of the desorption column 7, and a throttle valve 6, the carbon dioxide-loaded absorption medium is passed to a desorption column 7. In the lower part of the desorption column 7 the loaded absorption medium is heated by means of a heater (not shown) and regenerated. The carbon dioxide liberated leaves the desorption column 7 via the exhaust gas line 8. The desorption column 7 can, above the absorption medium inlet, have backwash trays or backwash sections which are preferably equipped with ordered packings (not shown), where entrained absorption medium is separated off from the liberated $CO_2$ using water or condensate. In the line 8, a heat exchanger having a top distributor or condenser can be provided. The regenerated absorption medium is subsequently fed by means of a pump 9 via the solvent-solvent heat exchanger 11, in which the regenerated absorption medium heats up the acid gas-loaded absorption medium and is itself cooled, and back to the heat exchanger 10 of the absorption column 2. To prevent the accumulation of absorbed substances which are not expelled or are only incompletely expelled in the regeneration, or of decomposition products in the absorption medium, a substream of the absorption medium taken off from the desorption column 7 can be fed to an evaporator in which low-volatility byproducts and decomposition products are produced as residue and the pure absorption medium is taken off as vapors. The condensed vapors are fed back to the absorption medium circuit. Expediently, a base, such as potassium hydroxide, can be added to the substream which, e.g. together with sulfate ions or chloride ions, forms low-volatility salts which are taken off from the system together with the evaporator residue.

EXAMPLES

The resistance of various amines to the action of oxygen was determined as follows:

In a 100 ml flask, 5 l(S.T.P.) air/h were bubbled into about 60 ml of amine at 120° C. for 6 days via a frit at atmospheric pressure. The vapor space above the solution was made inert by 10 l(S.T.P.) of $N_2$/h. The flask was equipped with a reflux condenser so that matter stripped out was substantially condensed and recycled.

Samples of the fresh solution and the solution treated for 6 days were taken and analyzed by GC.

GC method: 30 m RTX-5 Amine, (0.32 mm, 1.5 μm), 50° C.-3 min-7° C./min-280° C.-20 min
Sample 1:
2-Amino-2-methylpropan-1-ol (comparison)
Concentration of the original solution: 93.5%
Concentration after 6 days of experiment: 93.4%
Sample 2:
1-Amino-2-methylpropan-2-ol
Concentration of the original solution: 99.8%
Concentration after 6 days of experiment: 98.2%
Sample 3:
Monoethanolamine (comparison)
Concentration of the original solution: 100%
Concentration after 6 days of experiment: 32.8%
Sample 4:
Methyldiethanolamine (comparison)
Concentration of the original solution: 99.3%
Concentration after 6 days of experiment: 72.4%
Sample 5:
Methylmonoethanolamine (comparison)
Concentration of the original solution: 99.6%
Concentration after 6 days of experiment: 75.5%

The invention claimed is:

1. An absorption medium for removing carbon dioxide from gas streams which comprises an aqueous solution of an amine of the formula I $$HNR_2 \quad (I)$$

where one or both radicals R are

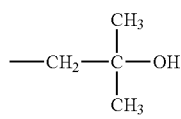

and the other radical R is hydrogen.

2. The absorption medium according to claim 1, in addition comprising at least one amine which is selected from
   (A) tertiary amines;
   (B) primary amines, where the amino group is bound to a tertiary carbon atom;
   (C) secondary amines, where the amino group is bound to at least one secondary or tertiary carbon atom;
   and mixtures thereof.

3. The absorption medium according to claim 2, comprising at least one amine which is selected from
   (A) tertiary amines having one or two hydroxyalkyl groups and two or one unsubstituted alkyl groups on the nitrogen atom, where the amino group is separated from the hydroxyl group(s) by at least two carbon atoms;
   (B) primary amines having at least one hydroxyl group, where the amino group is bound to a tertiary carbon atom and is separated from the hydroxyl group by at least two carbon atoms;
   (C) secondary amines having at least one hydroxyl group, where the amino group is bound to at least one secondary or tertiary carbon atom and is separated from the hydroxyl group by at least two carbon atoms;
   and mixtures thereof.

4. The absorption medium according to claim 2, comprising 1 to 30% by weight of amine of the formula I and 10 to 60% by weight of one or more amines (A) to (C), based on the total weight of the absorption medium, with the proviso that the maximum total amine content of the absorption medium is 65% by weight.

5. The absorption medium according to claim 1, in addition comprising at least one amine which is selected from
   (D) primary or secondary alkanolamines;
   (E) alkylenediamines;
   (F) polyalkylenepolyamines;
   (G) amines of the general formula

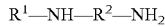

where $R^1$ is $C_1$-$C_6$-alkyl and $R^2$ is $C_2$-$C_6$-alkylene;
   (H) cyclic amines having a 5-, 6- or 7-membered saturated ring which comprises an NH group and if appropriate a further heteroatom, in particular an oxygen or nitrogen atom;
   and mixtures thereof.

6. The absorption medium according to claim 4, comprising at least one amine which is selected from
   (D) monoethanolamine, diethanolamine, methylethanolamine;
   (E) hexamethylenediamine;
   (F) diethylenetriamine;
   (G) 3-methylaminopropylamine;
   (H) piperazine, 2-methylpiperazine, N-methylpiperazine, N-ethylpiperazine, N-aminoethylpiperazine, homopiperazine, piperidine, morpholine;
   and mixtures thereof.

7. The absorption medium according to claim 5, comprising 20 to 60% by weight of amine of the formula I and 1 to 25% by weight of one or more amines (D) to (H), based on the total weight of the absorption medium, with the proviso that the maximum total amine content of the absorption medium is 65% by weight.

8. A method for removing carbon dioxide from a gas stream, the gas stream being brought into contact with a liquid absorption medium which comprises an aqueous solution of an amine of the formula I, $$HNR_2 \quad (I)$$

where one or both radicals R are

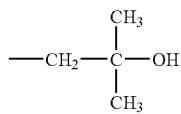

and the other radical R is hydrogen.

9. The method according to claim 8, the partial pressure of the carbon dioxide in the gas stream being less than 500 mbar.

10. The method according to claim 8, the gas stream originating from
   a) the oxidation of organic substances,
   b) the composting or storage of waste materials comprising organic substances, or
   c) the bacterial decomposition of organic substances.

11. The method according to claim 8, the loaded absorption medium being regenerated by
   a) heating,
   b) expanding,
   c) stripping with an inert fluid
   or a combination of two or all of these measures.

12. The absorption medium according to claim 3, comprising 1 to 30% by weight of amine of the formula I and 10 to 60% by weight of one or more amines (A) to (C), based on the total weight of the absorption medium, with the proviso that the maximum total amine content of the absorption medium is 65% by weight.

13. The absorption medium according to claim 6, comprising 20 to 60% by weight of amine of the formula I and 1 to 25% by weight of one or more amines (D) to (H), based on the total weight of the absorption medium, with the proviso that the maximum total amine content of the absorption medium is 65% by weight.

14. The method according to claim 9, the gas stream originating from
   a) the oxidation of organic substances,
   b) the composting or storage of waste materials comprising organic substances, or
   c) the bacterial decomposition of organic substances.

15. The method according to claim 14, the loaded absorption medium being regenerated by
   a) heating,
   b) expanding,
   c) stripping with an inert fluid
   or a combination of two or all of these measures.

16. The method according to claim 9, the loaded absorption medium being regenerated by
   a) heating,
   b) expanding,
   c) stripping with an inert fluid
   or a combination of two or all of these measures.

17. The method according to claim 10, the loaded absorption medium being regenerated by
   a) heating,
   b) expanding,
   c) stripping with an inert fluid
   or a combination of two or all of these measures.

* * * * *